Patented Apr. 23, 1929.

1,709,993

UNITED STATES PATENT OFFICE.

WALTER MIEG AND ALBERT JOB, OF ELBERFELD, GERMANY, ASSIGNORS TO GRASSELLI DYESTUFF CORPORATION, OF NEW YORK, N. Y., A CORPORATION OF DELAWARE.

AROYL-AMINO-DIPHTHALOYL-ACRIDONES AND PROCESS OF PREPARING THE SAME.

No Drawing. Application filed May 23, 1927, Serial No. 193,722, and in Germany May 27, 1926.

The present invention relates to aroyl-amino-diphthaloyl-acridones of the general formula:

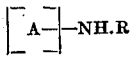

wherein A represents a diphthaloyl-acridone and R represents an aroyl radicle.

Our new compounds can be produced by aroylating the mono-amido-diphthaloyl-acridones which are obtainable by nitrating a diphthaloyl-acridone and reducing the nitro compound thus obtained, as described in our co-pending applications Ser. No. 193,723 and No. 193,721, filed on May 23, 1927.

Our new vat dyestuffs are in dry state brownish powders, soluble in concentrated sulfuric acid with orange shades, soluble in boiling nitro benzole with violet colors.

The following examples will illustrate our invention:

*Example 1.*—1 part by weight of the mono amino 3.4.5.6-diphthaloyl acridone obtainable according to the co-pending applications Serial No. 193,723 and No. 193,721, by nitrating 3.4.5.6-diphthaloyl acridone and reducing with aqueous sodium hydrosulfite solutions, is boiled with 30-40 parts by weight of nitro benzole and 0.7 parts by weight of benzoyl chloride until the formation of the violent benzoyl compound is complete. The benzoyl mono amino 3.4.5.6-diphthaloyl acridone is isolated by filtration after cooling. It dyes cotton from the hydrosulfite vat violet grey shades of excellent fastness properties, especially to light. It has the probable formula:

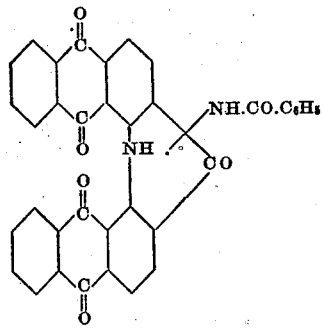

*Example 2.*—1 part by weight of the mono amino compound of 1.2.5.6-diphthaloyl acridone obtainable according to copending applications Serial No. 193,723 and No. 193,721, by nitrating 1.2.5.6-diphthaloyl acridone and reducing the mono nitro compound with alkaline hydrosulfite, is dissolved in 30-40 parts by weight of nitro benzole and boiled. After the addition of 0.7 parts by weight of benzoyl chloride, a crystalline benzoyl mono amino 1.2.5.6-diphthaloyl acridone is obtained in hone shaped (prismatic) leaflets possessing a bronze lustre, soluble in concentrated sulfuric acid with an orange color, and dyeing cotton from a violet vat in strong olive grey shades of excellent fastness properties. It dissolves in boiling nitro benzole with violet shades. It has the probable formula:

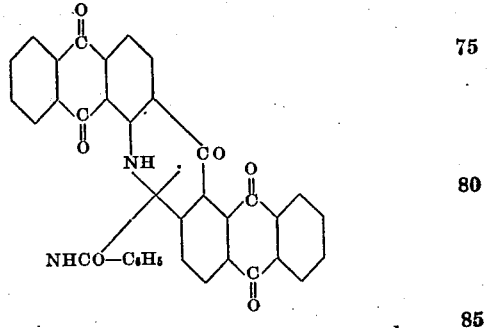

*Example 3.*—In the same manner as above the amino compounds of Examples 1 and 2 can also be acylated with other aroyl halogenides for instance ortho- or para-chlorobenzoyl chloride. From the mono amino compound of 1.2.5.6-diphthaloyl acridone and ortho-chlorobenzoyl chloride a vat dyestuff is thus obtained which dyes cotton from violet vat in greenish shades very fast to chlorine and to light.

We claim:

1. As new vat dyestuffs the aroylated mono amino diphthaloyl acridones which are in dry state powders possessing a bronze lustre, soluble in concentrated sulfuric acid with orange to brown orange shades, dyeing the fibre from a hydrosulfite vat in greyish colors, difficultly soluble in organic solutions such as nitro benzole.

2. As a new product the benzoylated mono amino 1.2.5.6-diphthaloyl acridone which is in dry state a crystal powder of hone shaped leaflets, possessing a bronze lustre, soluble in sulfuric acid with an orange color and dyeing the fibre from a violet vat in strong olive grey shades of excellent fastness properties, soluble in boiling nitro benzole with violet shades.

3. Materials dyed with the product described in claim 1.

4. Materials dyed with the product described in claim 2.

In testimony whereof, we affix our signatures.

WALTER MIEG.
ALBERT JOB.